US011855431B2

(12) United States Patent
Riley

(10) Patent No.: US 11,855,431 B2
(45) Date of Patent: Dec. 26, 2023

(54) MODULAR ELECTRONICS ROOFING ATTACHMENT AND METHODS OF USE THEREOF

(71) Applicant: BMIC LLC, Dallas, TX (US)

(72) Inventor: Xavier Riley, San Jose, CA (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 18/193,053

(22) Filed: Mar. 30, 2023

(65) Prior Publication Data

US 2023/0318276 A1    Oct. 5, 2023

Related U.S. Application Data

(60) Provisional application No. 63/325,413, filed on Mar. 30, 2022.

(51) Int. Cl.
*H02G 3/38* (2006.01)
*H02G 1/06* (2006.01)
*H02G 5/04* (2006.01)

(52) U.S. Cl.
CPC ............... *H02G 3/281* (2013.01); *H02G 1/06* (2013.01); *H02G 5/04* (2013.01)

(58) Field of Classification Search
None
See application file for complete search history.

(56) References Cited

U.S. PATENT DOCUMENTS

| 6,733,381 | B1 * | 5/2004 | Ploeger | F24F 13/082 |
| | | | | 454/366 |
| 7,219,473 | B2 * | 5/2007 | Mantyla | E04D 13/174 |
| | | | | 52/95 |
| 8,221,200 | B2 * | 7/2012 | Oaten | E04D 13/174 |
| | | | | 52/95 |
| 8,740,678 | B2 * | 6/2014 | Railkar | F24F 7/02 |
| | | | | 454/367 |
| 8,925,262 | B2 * | 1/2015 | Railkar | E04D 1/30 |
| | | | | 52/173.3 |
| 9,512,611 | B2 | 12/2016 | Schmitt et al. | |
| 9,603,281 | B2 | 3/2017 | Crosby, Jr. | |
| 10,021,804 | B1 | 7/2018 | Gray | |

(Continued)

FOREIGN PATENT DOCUMENTS

| CA | 3137656 A1 * | 5/2022 | ............ H02S 20/25 |
| DE | 3600374 A1 * | 7/1987 | |

(Continued)

*Primary Examiner* — Timothy J. Dole
*Assistant Examiner* — Muhammed Azam
(74) *Attorney, Agent, or Firm* — GREENBERG TRAURIG, LLP

(57) ABSTRACT

A ridge vent may cover a ridge slot in a roof of the structure to provide ventilation. A housing having a length, a width and a height that are sized to fit through a ridge slot of the roof includes a top portion proximal to the ridge vent, a bottom portion proximal to the interior of the structure and opposite to the top portion, and at least one wall extending between the top portion and the bottom portion. A securing mechanism is connected to the top portion of the housing to secure the housing within the ridge slot. An electronics bus is positioned within the housing and has an interface that enables operation of modular electronic devices that are removably positioned within the housing.

22 Claims, 6 Drawing Sheets

(56) References Cited

U.S. PATENT DOCUMENTS

| | | | |
|---|---|---|---|
| 2004/0093812 A1* | 5/2004 | Rotter | E04D 13/174 52/199 |
| 2007/0213003 A1* | 9/2007 | Railkar | E04D 13/174 454/365 |
| 2010/0043311 A1* | 2/2010 | Chich | E04D 13/152 52/302.1 |
| 2010/0112932 A1* | 5/2010 | Grubka | H01G 4/14 454/365 |
| 2012/0252348 A1* | 10/2012 | Rheaume | H02S 20/23 29/897.3 |
| 2012/0302153 A1* | 11/2012 | Macioch | F24F 7/025 454/341 |
| 2013/0344796 A1* | 12/2013 | Rossetta | E04D 13/174 454/365 |
| 2015/0244307 A1 | 8/2015 | Cameron | |
| 2021/0150458 A1* | 5/2021 | Robinson | G05D 1/101 |
| 2021/0226331 A1* | 7/2021 | Robinson | H01Q 3/04 |
| 2022/0235552 A1* | 7/2022 | Shiao | E04D 1/29 |

FOREIGN PATENT DOCUMENTS

| | | | | |
|---|---|---|---|---|
| EP | 2917430 A4 | 9/2015 | | |
| EP | 3968743 A1 | 3/2022 | | |
| JP | 2000145031 A | * | 5/2000 | |
| JP | 2001015091 A | * | 1/2001 | |
| JP | 2007534924 A | * | 11/2007 | |
| WO | WO-2014143787 A1 | * | 9/2014 | E04D 13/174 |
| WO | 2020-023653 A1 | | 1/2020 | |

* cited by examiner

MODULAR ELECTRONICS ROOFING ATTACHMENT AND METHODS OF USE THEREOF

FIELD OF TECHNOLOGY

The present disclosure generally relates to systems and apparatuses for a modular electronics roofing attachment and methods of use thereof, including a modular electronics roofing attachment configured for modular installation on a roof and for modular installation of electronic device modules.

BACKGROUND OF TECHNOLOGY

Residential and commercial roofs provide an ideal position for mounting electronic components due, for example, to the open access to the environment. For example, solar panels and other power generation devices may be advantageously mounted to a roof for exposure to the sun and other renewable power sources. Similarly, other components that would benefit from being exposed to the environment without interference or blockage by a roof may be added to the roof.

SUMMARY OF DESCRIBED SUBJECT MATTER

In some aspects, the techniques described herein relate to a system including: a ridge vent configured to cover a ridge slot in a roof of a structure to provide ventilation to an interior of the structure; a housing having a length, a width and a height that are sized to fit through a ridge slot of a roof of a structure into an interior of the structure; wherein the housing includes: a top portion proximal to the ridge vent, a bottom portion proximal to the interior of the structure and opposite to the top portion, and at least one wall extending between the top portion and the bottom portion; at least one securing mechanism connected to the top portion of the housing; wherein the at least one securing mechanism is configured to secure the housing within the ridge slot; at least one electronics bus positioned on the at least one wall within the housing; wherein the at least one electronics bus includes at least one interface that is configured to be utilized to operate a plurality of modular electronic devices that are removably positioned within the housing.

In some aspects, the techniques described herein relate to a system, wherein the length is configured to have a length difference between the length and a ridge vent length of the ridge vent to enable the ventilation around the housing.

In some aspects, the techniques described herein relate to a system, wherein the at least one securing mechanism includes a plurality of roofing nails; and wherein each roofing nail of the plurality of roofing nails extends through the ridge vent into a face of the roof to secure both the ridge vent and the at least one housing to the roof.

In some aspects, the techniques described herein relate to a system, wherein the at least one securing mechanism includes at least one adhesive that adheres the at least one securing mechanism to the ridge vent.

In some aspects, the techniques described herein relate to a system, wherein the at least one securing mechanism includes at least one additional fastening mechanism that secures the ridge vent to the roof.

In some aspects, the techniques described herein relate to a system, further including a plurality of slots arranged in a row along the at least one electronics bus; and wherein each slot of the plurality of slots includes the at least one interface and at least one standardized connector.

In some aspects, the techniques described herein relate to a system, wherein the at least one standardized connector is two standardized connector, the two standardized connector including: a first standardized connector configured for data communication between the at least one electronics bus and the at least one modular electronics device, and a second standardized connector configured to provide electrical power from the at least one electronics bus to the at least one modular electronics device.

In some aspects, the techniques described herein relate to a system, wherein the at least one standardized connector is one standardized connector configured to provide data communication and power between the at least one electronics bus to the at least one modular electronics device.

In some aspects, the techniques described herein relate to a system, wherein the at least one electronics bus extends in a direction along the length of the housing; and wherein each slot of the plurality of slots includes a distance along the at least one electronics bus equivalent to one rack unit.

In some aspects, the techniques described herein relate to a system, wherein the housing includes at least one opening proximal to the top portion; and wherein the at least one opening is configured to mate with an end of a wireway position along a face of the roof.

In some aspects, the techniques described herein relate to a system, wherein the plurality of modular electronic devices include at least two different modular electronic devices.

In some aspects, the techniques described herein relate to a method including: providing at least one modular electronics roofing attachment including: a housing having a length, a width and a height that are sized to fit through a ridge slot of a roof of a structure into an interior of the structure; wherein the housing includes: a top portion, a bottom portion and opposite to the top portion, and at least one wall extending between the top portion and the bottom portion; at least one securing mechanism connected to the top portion of the housing; wherein the at least one securing mechanism is configured to secure the housing within the ridge slot; at least one electronics bus positioned on the at least one wall within the housing; wherein the at least one electronics bus includes at least one interface that is configured to be utilized to operate a plurality of modular electronic devices that are removably positioned within the housing. inserting the housing into the ridge slot such that the bottom portion extends into the interior of the structure; securing the housing within the ridge slot by the at least one securing mechanism; and wherein a ridge vent is configured to cover the ridge slot in the roof to provide ventilation to an interior of the structure.

In some aspects, the techniques described herein relate to a method, wherein the length is configured to have a length difference between the length and a ridge vent length of the ridge vent to enable the ventilation around the housing.

In some aspects, the techniques described herein relate to a method, wherein the at least one securing mechanism includes a plurality of roofing nails; and wherein each roofing nail of the plurality of roofing nails extends through the ridge vent into a face of the roof to secure both the ridge vent and the at least one housing to the roof.

In some aspects, the techniques described herein relate to a method, wherein the at least one securing mechanism includes at least one adhesive that adheres the at least one securing mechanism to the ridge vent.

In some aspects, the techniques described herein relate to a method, wherein the at least one securing mechanism includes at least one additional fastening mechanism that secures the ridge vent to the roof.

In some aspects, the techniques described herein relate to a method, wherein the at least one modular electronic roofing attachment further includes a plurality of slots arranged in a row along the at least one electronics bus; and wherein each slot of the plurality of slots includes the at least one interface and at least one standardized connector.

In some aspects, the techniques described herein relate to a method, wherein the at least one standardized connector is two standardized connector, the two standardized connector including: a first standardized connector configured for data communication between the at least one electronics bus and the at least one modular electronics device, and a second standardized connector configured to provide electrical power from the at least one electronics bus to the at least one modular electronics device.

In some aspects, the techniques described herein relate to a method, wherein the at least one standardized connector is one standardized connector configured to provide data communication and power between the at least one electronics bus to the at least one modular electronics device.

In some aspects, the techniques described herein relate to a method, wherein the at least one electronics bus extends in a direction along the length of the housing; and wherein each slot of the plurality of slots includes a distance along the at least one electronics bus equivalent to one rack unit.

In some aspects, the techniques described herein relate to a method, wherein the housing includes at least one opening proximal to the top portion; and wherein the at least one opening is configured to mate with an end of a wireway position along a face of the roof.

In some aspects, the techniques described herein relate to a method, wherein the plurality of modular electronic devices include at least two different modular electronic devices.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 4 illustrate modular electronics roofing attachments for installation in and/or on roofs of structures. The following embodiments provide technical solutions and technical improvements that overcome technical problems, drawbacks and/or deficiencies in the technical fields involving attachment of and communication with electronics components through a roof for data communication and power delivery between an interior and exterior of a structure. As explained in more detail, below, technical solutions and technical improvements herein include aspects of an improved roofing attachment that that configured to enable standardized fitment to roofs and provide functionality and protection for electronic device modules. Based on such technical features, further technical benefits become available to users and operators of these systems and methods.

Figure 1A:
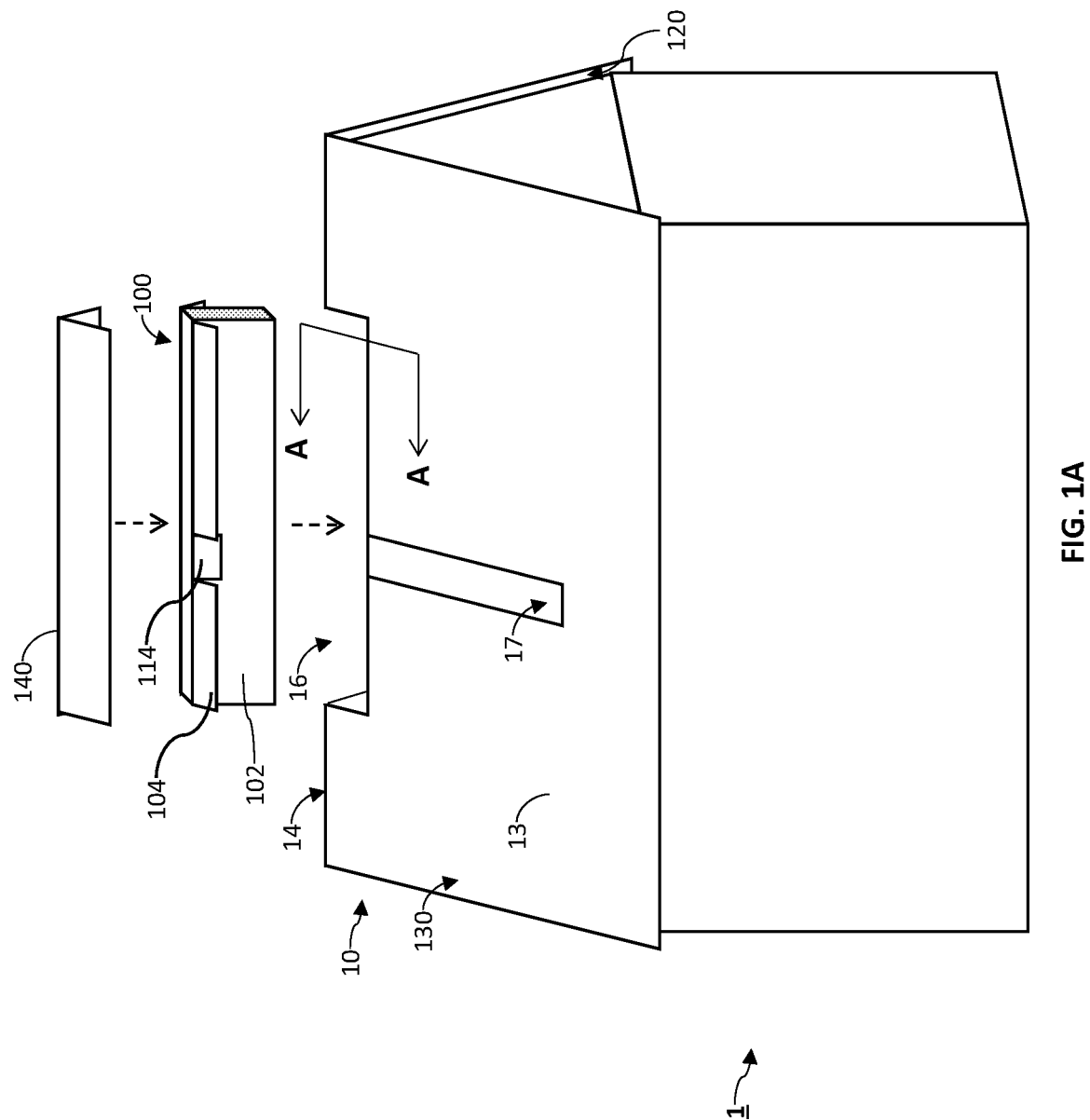
FIG. 1A illustrates a structure having a roof 10 and a ridge vent 140 in accordance with one or more embodiments of the present disclosure.

FIG. 1A illustrates a structure having a roof 10 and a ridge vent 140 in accordance with one or more embodiments of the present disclosure.

In some embodiments, a roof 10 is disposed on a structure 1, where the roof 10 includes a ridge 14 at the apex of two or more roof faces 13. In some embodiments, a ridge vent 140 may be provided along at least a portion of the ridge 14 to provide venting from an interior of the structure 1. In some embodiments, the ridge vent 140 may extend along a substantial portion of the length of the roof ridge 14. This may be accomplished by attaching shorter ridge vent 140 sections end to end along the ridge 14, or by using a continuous rolled ridge vent 140 configuration or any other suitable ridge vent 140 configuration for extending across all or a portion of the ridge 14, e.g., based on venting needs of the structure 1. Further, while only one side of the ridge vent 140 is depicted in FIG. 1A, there may be multiple separate ridge vents 140 along the ridge 14 and/or the roof 10 may include multiple ridges 14, where one or more of the ridges 14 include one or more ridge vents 140.

In some embodiments, the ridge vent 140 may be installed along the ridge 14 of a gable roof. The roof, in this example, comprises a roof deck 120 that is supported atop rafters. The rafters meet and are attached at a ridge beam that extends along the roof ridge 14. The roof deck 120 is cut away on either side of the roof ridge 14 to form a ridge slot 16 that is open to the attic space below. The roof deck 120 is covered with a waterproofing layer 130 that extend underneath the ridge vent 140 toward the ridge slot 16 as shown. The ridge vent 140 may be made of plastic and is laterally flexible so that it can be bent across a roof ridge 16 and conformed to virtually any roof pitch, though any other suitable material may be used, including, e.g., aluminum fiberglass or other polymers, metals, composites or any combination thereof. In some embodiments, the ridge vent 140 may be secured to the roof deck with fasteners, which may be nails but can be screws or any other appropriate fastener.

In some embodiments, the waterproofing layer 130 may include, but is not limited to, one or more: shingles, waterproofing membranes, underlayment, tiles and/or photovoltaic panels among other layer or layers of waterproofing components or any combination thereof.

In some embodiments, a modular electronics roofing attachment 100 is configured to be installed within the ridge slot 16 and covered by the ridge vent 14. In some embodiments, the modular electronics roofing attachment 100 provides a housing for electronic device modules that can be installed and/or removed in a modular fashion within the body of the modular electronics roofing attachment 100. Accordingly, in some embodiments, the modular electronics roofing attachment 100 may have a standardized size for accepting electronic device modules. In some embodiments, the size of the modular electronics roofing attachment 100 may be defined by a length, width and depth of a housing. In some embodiments, the length may be defined by a distance parallel to a direction of the ridge 14, the width be may defined by a distance perpendicular to the direction of the ridge 14 in a plane having constant elevation, and the depth may be defined by a distance perpendicular to the direction of the ridge 14 into the interior of the structure 1.

In some embodiments, the slots may accommodate any suitable electronic device modules. Such electronic device modules may include any combination of hardware and/or software for providing functionality to accessories mounted externally relative to the structure 1. For example, the roof 10 may have roofing accessories mounted thereon. Such roofing accessories may include one or more, e.g., photovoltaic panels, photovoltaic modules, antennas, power outlets, imaging devices, radio-frequency identification (RFID) devices (e.g., a passive RFID tag, an active RFID tag, an RFID reader, an NFC tag, etc.), weather sensors, broadcast beacons, cabling (e.g., telephone wires, fiber optic cabling, coaxial cabling, power lines, etc.), among other externally positioned accessories that may be advantageous connected to electronic devices protected within the structure 1.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other.

Accordingly, in some embodiments, the electronic device modules may include any suitable electronic device for providing data communication, processing resources, memory resources, and/or electrical resources to one or more roofing accessories positioned on or near the roof 10. For example, the electronic device modules may include a power inverter for exchanging power between interior power sources and/or power draws and the one or more roofing accessories. As another example, the electronic device modules may include a compute module for providing network attached memory, storage and/or processing resources connected to a network via a roof mounted antenna.

In some embodiments, the electronic device modules may be mounted within the modular electronic roofing attachment 100, e.g., in a vertical slot arrangement, where one or more rows of slots are positioned along the length of the modular electronic roofing attachment 10 with a width of an electronic device module extending in a direction along the width of the modular electronic roofing attachment 10, a thickness of the electronic device module extending in a direction along a slot along the length of the modular electronic roofing attachment 10, and a height of the electronic device module extending from a bottom of the modular electronic roofing attachment 10 upwards toward the ridge vent 140 along the depth of the modular electronic roofing attachment 10. In some embodiments, the vertical slot arrangement may orient the rows along the width of the modular electronic roofing attachment 100 such that one or more rows of slots are positioned along the width of the modular electronic roofing attachment 10 with a width of an electronic device module extending in a direction along the length of the modular electronic roofing attachment 10, a thickness of the electronic device module extending in a direction along a slot along the length of the modular electronic roofing attachment 10, and a height of the electronic device module extending from a bottom of the modular electronic roofing attachment 10 upwards toward the ridge vent 140 along the depth of the modular electronic roofing attachment 10.

However, other arrangements may be used, such as a horizontal slot arrangement where one or more columns of slots are positioned along the depth of the modular electronic roofing attachment 10 such that a width of an electronic device module extending in a direction along the width of the modular electronic roofing attachment 10, a thickness of the electronic device module extending in a direction along a slot along the depth of the modular electronic roofing attachment 10, and a length of the electronic device module extending in a direction along the length of the modular electronic roofing attachment 10. In other words, the electronic device modules may be slotted in a vertical arrangement in a row along the length of the modular electronic roofing attachment 10 in the vertical slot arrangement and the electronic device modules may be slotted in a horizontal arrangement such as a stack along the depth of the modular electronic roofing attachment 10.

Thus, the modular electronics roofing attachment 100 may have slots may with a size to fit a series of electronic device modules. In some embodiments, the size of the slot may be in a range of, e.g., 1 to 6 inches, or other suitable range. An example size of the slots along the length of the electronics roofing attachment 100 may be, e.g., one rack unit, which is equivalent to approximately 1.25 inches.

Moreover, in some embodiments, the modular electronics roofing attachment 100 may be configured as a drop-in module for the ridge slot 16 such that a contractor or builder may fit the modular electronics roofing attachment 100 into the ridge slot 16 without altering any design plans for the ridge vent 140. Thus, in some embodiments, the ridge slot 16 may have a predetermined size or may be selected from a set of predetermined sizes that are standardized and/or common for ridge vents 140 and ridge 14 ventilation. In some embodiments, the ridge slot 16 may be formed with a width that is sized for the ridge vent 140 or for any other suitable or common width. Alternatively, or in addition, the ridge slot 16 may be formed based on the width of the modular electronics roofing attachment 100.

Thus, the modular electronics roofing attachment 100 may have a width that is selected to be compatible with the ridge vent 140 and/or with the common width of the ridge slot 16. For example, the modular electronics roofing attachment 100 may have a width of, e.g., 6 inches, 7 inches, 8 inches, 9 inches, 10 inches, 11 inches, 12 inches, 13 inches, 14 inches, 15 inches, 16 inches, 17 inches, 18 inches, 19 inches, 20 inches, or any other suitable width within, e.g., the range of 8 inches to 10 inches, in a range of 6 inches to 24 inches, or in any other suitable range of widths.

Similarly, in some embodiments, the ridge slot 16 may include a predetermined or common depth into the structure 1. For example, the ridge slot 16 may be an opening into an open space of an attic. Accordingly, the depth of the modular electronics roofing attachment 100 may be configured or selected for the depth of the ridge slot 16. In some embodiments, because the ridge slot 16 may open into the attic of the structure, thus providing multiple feet of depth below the ridge 14, the modular electronics roofing attachment 100 may be sized according to the electronic device modules. In some embodiments, the modular electronics roofing attachment 100 may have a depth extending from the ridge 14 into the interior of the structure for a distance of, e.g., 6 inches, 7 inches, 8 inches, 9 inches, 10 inches, 11 inches, 12 inches, 13 inches, 14 inches, 15 inches, 16 inches, 17 inches, 18 inches, 19 inches, 20 inches, 21 inches, 22 inches, 23 inches, 24 inches, 25 inches, 26 inches, 27 inches, 28 inches, 29 inches 30 inches or any other suitable width within, e.g., the range of 10 inches to 24 inches, in a range of 12 inches to 18 inches, or in any other suitable range of depths into the interior of the structure.

In some embodiments, the modular electronics roofing attachment 100 may be inserted into the ridge slot 16 and covered by the ridge vent 140. The ridge vent 140 may thus provide a water shedding layer to protect the electronic device modules from precipitation and debris. In some embodiments, to preserve the ability to ventilate the interior of the structure via the ridge vent 140, the modular electronics roofing attachment 100 may have a length less than the length of the ridge slot 16 while the length of the ridge vent 140 may be coextensive with or exceed the length of the ridge slot 16. Thus, there may be openings in the ridge slot 16 between the ridge 14 and one or both ends of the modular electronics roofing attachment 100 where air may ventilate through the ridge vent 140. In some embodiments, the length of the ridge slot 16 and of the modular electronics roofing attachment 100 may be selected according to a desired number of electronic device modules and a ventilation need.

For example, the length of the modular electronics roofing attachment 100 may be any length in a range from, e.g., 6 inches to 100 feet, 1 feet to 100 feet, 2 feet to 100 feet, 3 feet to 100 feet, 4 feet to 100 feet, 5 feet to 100 feet, 6 feet to 100 feet, 7 feet to 100 feet, 8 feet to 100 feet, 9 feet to 100 feet, 10 feet to 100 feet, 1 foot to 50 feet, 2 feet to 50 feet, 3 feet to 50 feet, 4 feet to 50 feet, 5 feet to 50 feet, 6 feet to 50 feet, 7 feet to 50 feet, 8 feet to 50 feet, 9 feet to 50 feet, 10 feet to 50 feet, 1 feet to 40 feet, 2 feet to 40 feet, 3 feet to 40 feet, 4 feet to 40 feet, 5 feet to 40 feet, 6 feet to 40 feet, 7 feet to 40 feet, 8 feet to 40 feet, 9 feet to 40 feet, 10 feet to 40 feet, 1 feet to 30 feet, 2 feet to 30 feet, 3 feet to 30 feet, 4 feet to 30 feet, 5 feet to 30 feet, 6 feet to 30 feet, 7 feet to 30 feet, 8 feet to 30 feet, 9 feet to 30 feet, 10 feet to 30 feet, 1 feet to 20 feet, 2 feet to 20 feet, 3 feet to 20 feet, 4 feet to 20 feet, 5 feet to 20 feet, 6 feet to 20 feet, 7 feet to 20 feet, 8 feet to 20 feet, 9 feet to 20 feet, 10 feet to 20 feet, or any other suitable length or range of lengths for providing ventilation while housing one or more electronic device modules.

Figure 1B:
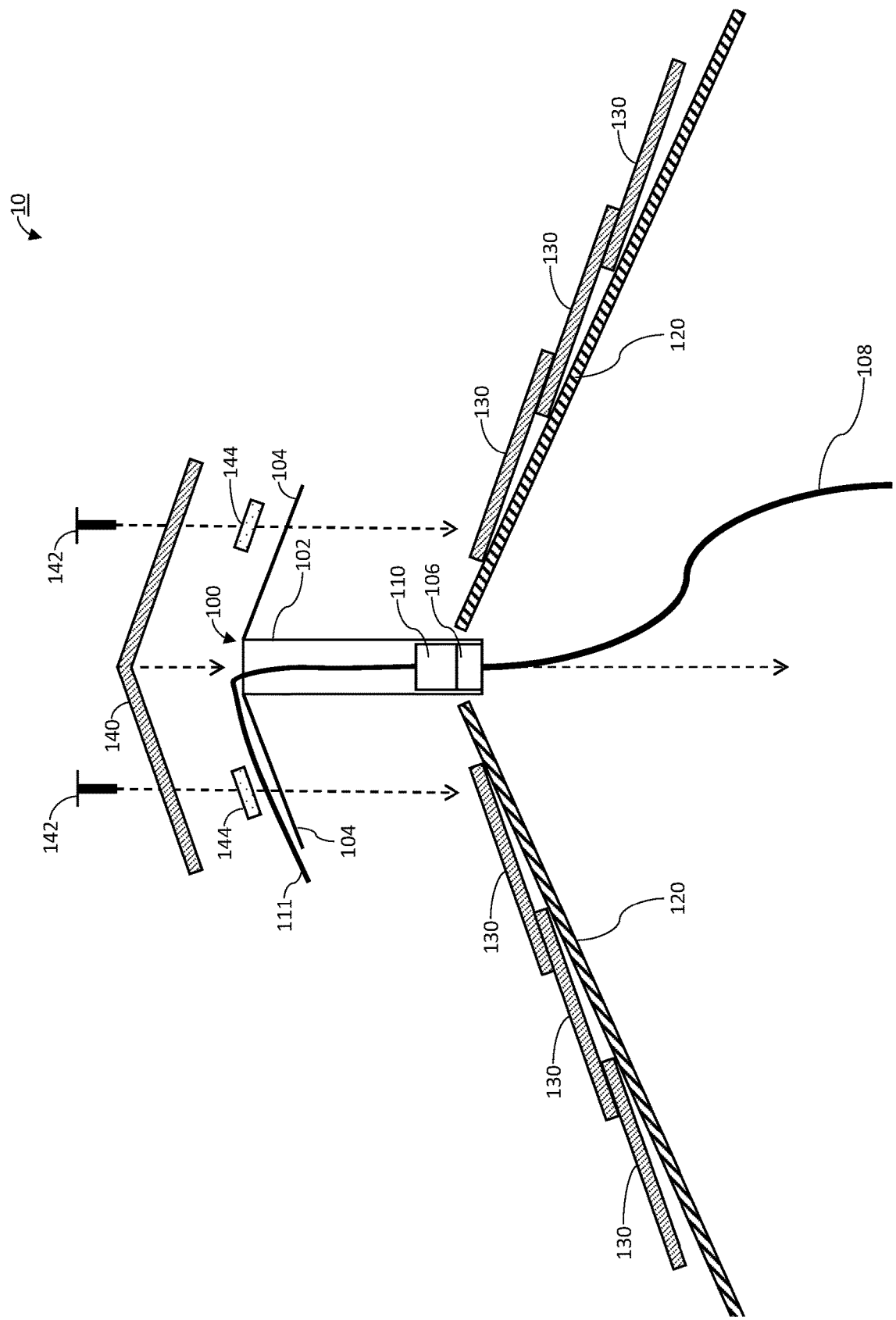
FIG. 1B depicts a cross section illustration of cross section A-A of FIG. 1A, illustrating a modular electronics roofing attachment 100 installed in the ridge vent 140 of the roof 10 in accordance with one or more embodiments of the present disclosure.

In some embodiments, the modular electronics roofing attachment 100 may include one or more securing mechanisms 104. In some embodiments, the securing mechanism 104 may be positions towards a top portion of the modular electronics roofing attachment 100 to provide a component that attaches the modular electronics roofing attachment 100 to the ridge 14, the ridge vent 140, the roof face(s) 13, the roof deck 120, and/or a waterproofing layer 130, either directly or indirectly. For example, the securing mechanism(s) 104 may include, e.g., one or more extensions as illustrated in FIGS. 1A and 1B that extend as tabs and/or wings from the housing of the modular electronics roofing attachment 100 to overlap with the waterproofing layer 130 and/or roof deck 120 such that the housing of the modular electronics roofing attachment 100 hangs down into the interior of the structure 1 through the ridge slot 16. In some embodiments, the securing mechanism(s) 104 may include any other suitable component for securing the modular electronics roofing attachment 100 in the ridge slot 16, or any combination thereof, including but not limited to, e.g., one or more hooks, clamps, tabs, wings, fasteners (e.g., bolt, screw, rivet, pin, etc.), adhesive, snap fitments, latches, or any other suitable securing mechanism or any combination thereof.

In some embodiments, the roof 10 may include one or more wireways 17 that provide an enclosure for wiring, cabling, and other peripherals of the roofing accessories. In some embodiments, the wireway 17 may be over the waterproofing layer 130, directly on roof deck 120 and/or recessed into the roof deck 120. For example, the wireway 17 may formed on or in the roof 10 such that a top surface of the enclosure of the wireway 17 is coplanar with a top surface of the roof deck 120 and/or the waterproofing layer 130. For example, the wireway 17 may be covered by the waterproofing layer 130 and/or by an additional watershedding component.

In some embodiments, enable the wiring, cabling and/or peripherals in the wireway 17 to interface with an electronic device module 110 within the modular electronics roofing attachment 100, the housing of the modular electronics roofing attachment 100 may include an opening 114 configured to mate with the wireway 17 such that wiring and/or cabling of the roofing accessories may enter the modular electronics roofing attachment 100 to interface with the electronic device module. Alternatively, or in addition, wiring and/or cabling of the electronic device module may exit the modular electronics roofing attachment 100 to interface with the wiring, cabling and/or peripherals of the roofing accessories.

FIG. 1B depicts a cross section illustration of cross section A-A of FIG. 1A, illustrating a modular electronics roofing attachment 100 installed in the ridge vent 140 of the roof 10 in accordance with one or more embodiments of the present disclosure.

In some embodiments, an example of the modular electronics roofing attachment 100 adapted for insertion into the roof slot 16 may include securing mechanisms 104 including extensions extending from a top end of the housing 102 of the modular electronics roofing attachment 100. In some embodiments, the extensions extend outwards over the roof 10 such that each extension overlaps with opposing sides of the ridge 14 of the roof 10. Thus, the modular electronics roofing attachment 100 may be inserted into the ridge slot 16 and prevented by the extensions from falling through the ridge slot 16.

In some embodiments, to secure the modular electronics roofing attachment 100 within the ridge slot 16, the ridge vent 140 may cover the modular electronics roofing attachment 100 such that the ridge vent 140 overlaps with the extensions. Fasteners 142 may be used such that each fastener 142 penetrates both the ridge vent 140 and at least one extension of the modular electronics roofing attachment 100 and into the roof deck 120. In some embodiments, the fasteners 142 may also penetrate the waterproofing layer 130. Accordingly, the extensions and the ridge vent 140 may be attached to the roof 10 over the waterproofing layer 130. Alternatively, the extensions may be positioned under the waterproofing layer 130 while the ridge vent 140 is positioned over the waterproofing layer 130. In some embodiments, the waterproofing layer 130 may be over both the ridge vent 140 and the extensions, or may not overlap with one or both of the ridge vent 140 and/or the extensions. Any configuration of the waterproofing layer 130, the extensions and the ridge vent 140 may be employed.

In some embodiments, the ridge vent 140 may be used with an air-permeable mat 144 of fibrous material that can be of randomly oriented synthetic, air-permeable fibers with varying mesh sizes. The synthetic fibers, such as made by nylon and polyester are randomly aligned into a web. The thickness of the mat may be from about 0.5 to 3 inches. The air-permeable mat 144 can be cut into strips the length and width of which is determined by the length and width of the ridge vent 140 for which the strip is used. The air-permeable mat 144 can be placed on the waterproofing layer 130. Alternatively, the air-permeable mat 144 may be integrated to the ridge vent 140 during manufacture or post-manufacture by any known method including, but not limited to, adhesively fixing, using burrs or by hooking the mat with hooks integral with the ridge vent 140.

In some embodiments, the process of installing the ridge vent 140 may include the steps of placing ridge vent 140 over the modular electronics roofing attachment 100 and the ridge slot 16 of the roof ridge 14, flexing the ridge vent 140 at a center hinge to conform to the roof, and/or fixing the ridge vent 140 to the roof 10 with the fasteners 142. In some embodiments, the fasteners 142 may include, e.g., nails, screws, hooks, rivets or adhesives or any other known method can fix the ridge vent 140 to the roof. Further, the air-permeable mat 144 can be placed along the roof ridge 14 adjacent to the ridge slot 16 prior to placing the ridge vent 140 over the ridge slot 16.

In some embodiments, the air-permeable mat 144 may be positioned between the ridge vent 140 and the securing mechanism(s) 104 of the modular electronics roofing attachment 100, between the modular electronics roofing attachment 100 and the waterproofing layer 130, or both. In some embodiments, the air-permeable mat 144 may be configured to allow electronic device module wiring 111 to traverse the air-permeable mat 144 such that the electronic device module wiring 111 may extend between the exterior of the modular electronics roofing attachment 100 and the interior of the modular electronics roofing attachment 100 in order to interface with the roofing accessories and/or with wiring/cabling/peripherals thereof. In some embodiments, to enable the electronic device module wiring 111 to extend through the air-permeable mat 144, the air-permeable mat 144 may include, e.g., a gap sized to fit the electronic device module wiring 111. Alternatively, or in addition, the air-permeable mat 144 may be compressible such that the electronic device module wiring 111 may be pressed between the air-permeable mat 144 and the ridge vent 140 or securing mechanism(s) 104. In some embodiments, the electronic device module wiring 111 may extend between the ridge vent 140 and the securing mechanism 104 without the air-permeable mat 144, and/or may extend through the opening 114 as described above.

In some embodiments, the electronic device module wiring 111 may be connected to an electronic device module 110 within the housing 102 of the modular electronics roofing attachment 100. In some embodiments, the electronic device module 110 may include any suitable electronic device for providing data communication, processing components, memory components, and/or electrical components to one or more roofing accessories positioned on or near the roof 10. For example, the electronic device module 110 may include a power inverter for exchanging power between interior power sources and/or power draws and the one or more roofing accessories. As another example, the electronic device module 110 may include a compute module for providing network attached memory, storage and/or processing resources connected to a network via a roof mounted antenna.

In some embodiments, the electronic device module 110 may be connected to other electronic device modules 110 within the modular electronics roofing attachment 100 and/or with power and/or computational resources in the interior of the structure 1. In some embodiments, an electronics bus 106 may be positioned with the module electronics roofing attachment 100 to interface with the electronic device modules 110 to provide power and/or data connections with the other electronic device modules 110 within the modular electronics roofing attachment 100 and/or with power and/or computational resources in the interior of the structure 1. For example, the electronics bus 106 may include a power bus, a power cable, a data bus, a control bus, an address bus, among other busses and/or connections or any combination thereof.

In some embodiments, a cable 108 may extend out of the housing 102 of the modular electronics roofing attachment 100. In some embodiments, the cable 108 may connect the electronics bus 106 to power and/or computational components within the interior of the structure. In some embodiments, the cable 108 may pass electrical power between power module (e.g., a battery, generator or other power module or any combination thereof) and the electronic device module 110. In some embodiments, the cable 108 may pass data between the electronic device module 110 and one or more computing devices, WiFi routers, or other computational components within the structure 1. Thus, the modular electronics roofing attachment 100 leverages the ridge slot 16 to enable the electronics bus 106 to provide an interface in the modular electronics roofing attachment 100 to enable electronic device modules 110 to communicate with, exchange electrical power and/or control one or more roofing accessories and components in the structure 1.

Figure 2A:
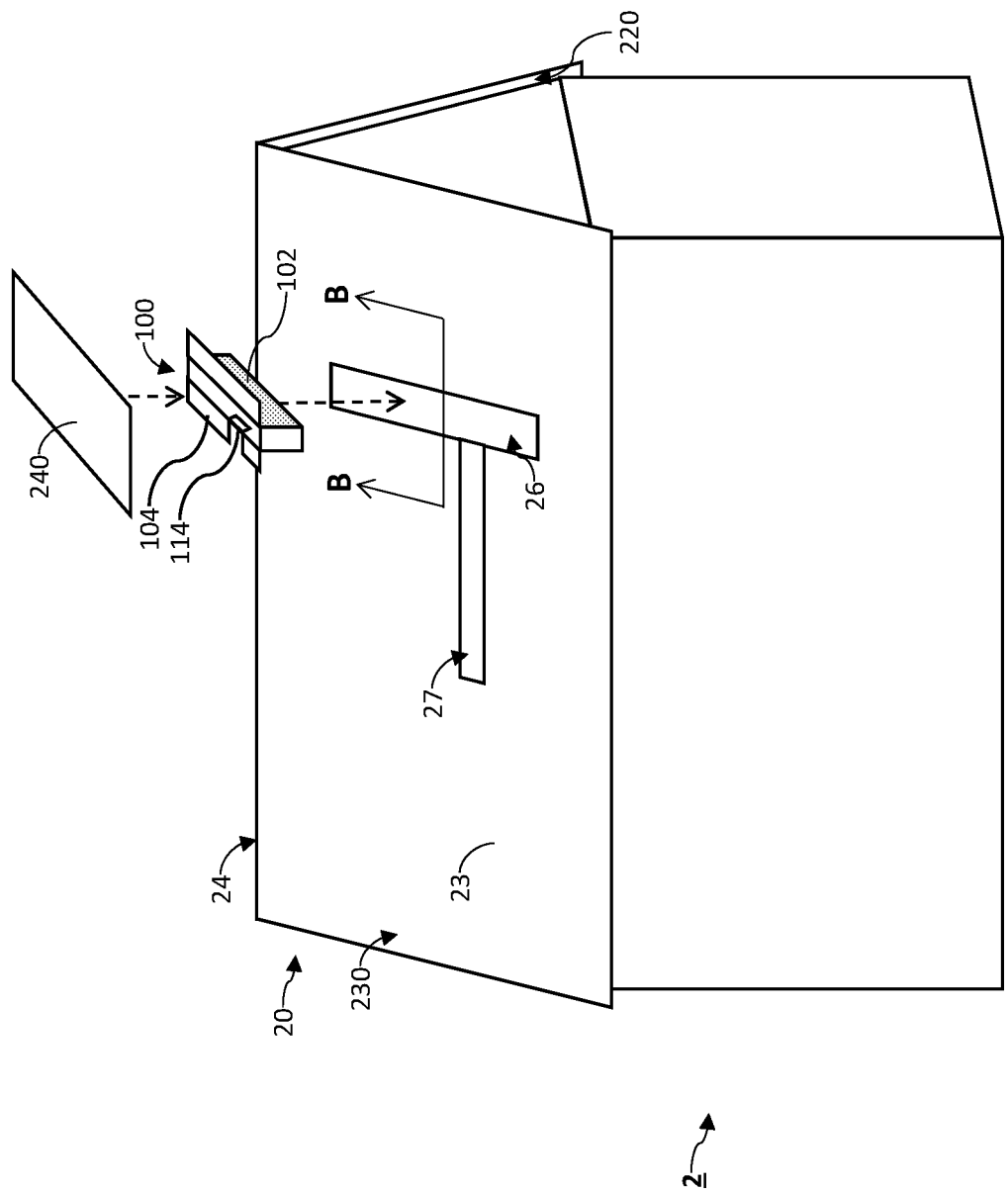
FIG. 2A illustrates a structure 2 having a roof 20 and a roof face 23 in accordance with one or more embodiments of the present disclosure.

FIG. 2A illustrates a structure 2 having a roof 20 and a roof face 23 in accordance with one or more embodiments of the present disclosure.

In some embodiments, a roof 20 is disposed on a structure 2, where the roof 20 includes a ridge 24 at the apex of two or more roof faces 23. In some embodiments, a ridge vent 140 may be provided along at least a portion of the ridge 24 to provide venting from an interior of the structure 2. In some embodiments, the roof 20 includes a roof deck 220 that is supported atop rafters. The rafters meet and are attached at a ridge beam that extends along the roof ridge 24. The roof deck 220 is cut away on a particular roof face 23 to form a roof deck slot 26 that is open to the attic space below.

In some embodiments, a cover 240 may be provided to overlay the roof deck slot 26 and provide waterproofing, protection from debris and/or impact, or other protection for the roof deck slot 26 or any combination thereof. The roof deck 220 is covered with a waterproofing layer 230 that extend over or underneath the cover 240 toward the roof deck slot 26 as shown. The cover 240 may be made of plastic and is laterally flexible so that it can be bent across ridges, cures, corners, etc. and conformed to virtually any roof contour, though any other suitable material may be used, including, e.g., aluminum fiberglass or other polymers, metals, composites or any combination thereof. In some embodiments, the cover 240 may be secured to the roof deck with fasteners, which may be nails but can be screws or any other appropriate fastener.

In some embodiments, the waterproofing layer 230 may include, but is not limited to, shingles, waterproofing membranes, underlayment, tiles and photovoltaic panels.

In some embodiments, a modular electronics roofing attachment 100 is configured to be installed within the roof deck slot 26 and covered by the cover 240. In some embodiments, the modular electronics roofing attachment 100 provides a housing for electronic device modules that can be installed and/or removed in a modular fashion within the body of the modular electronics roofing attachment 100. Accordingly, in some embodiments, the modular electronics roofing attachment 100 may have a standardized size for accepting electronic device modules. In some embodiments, the size of the modular electronics roofing attachment 100 may be defined by a length, width and depth of a housing. In some embodiments, the length may be defined by a distance parallel to a direction of the ridge 24, the width be may defined by a distance perpendicular to the direction of the ridge 24 in a plane parallel with the roof face 23, and the depth may be defined by a distance perpendicular to the direction of the roof face 23 into the interior of the structure 2.

In some embodiments, the slots may accommodate any suitable electronic device modules. Such electronic device modules may include any combination of hardware and/or software for providing functionality to accessories mounted externally relative to the structure 2. For example, the roof 20 may have roofing accessories mounted thereon. Such roofing accessories may include one or more, e.g., photovoltaic panels, photovoltaic modules, antennas, power outlets, imaging devices, radio-frequency identification (RFID) devices (e.g., a passive RFID tag, an active RFID tag, an RFID reader, an NFC tag, etc.), weather sensors, broadcast beacons, cabling (e.g., telephone wires, fiber optic cabling, coaxial cabling, power lines, etc.), among other externally positioned accessories that may be advantageous connected to electronic devices protected within the structure 2.

Accordingly, in some embodiments, the electronic device modules may include any suitable electronic device for providing data communication, processing resources, memory resources, and/or electrical resources to one or more roofing accessories positioned on or near the roof 20. For example, the electronic device modules may include a power inverter for exchanging power between interior power sources and/or power draws and the one or more roofing accessories. As another example, the electronic device modules may include a compute module for providing network attached memory, storage and/or processing resources connected to a network via a roof mounted antenna.

In some embodiments, the electronic device modules may be mounted within the modular electronic roofing attachment 100, e.g., in a vertical slot arrangement, where one or more rows of slots are positioned along the length of the modular electronic roofing attachment 10 with a width of an electronic device module extending in a direction along the width of the modular electronic roofing attachment 10, a thickness of the electronic device module extending in a direction along a slot along the length of the modular electronic roofing attachment 10, and a height of the electronic device module extending from a bottom of the modular electronic roofing attachment 10 upwards toward the ridge vent 140 along the depth of the modular electronic roofing attachment 10. In some embodiments, the vertical slot arrangement may orient the rows along the width of the modular electronic roofing attachment 100 such that one or more rows of slots are positioned along the width of the modular electronic roofing attachment 10 with a width of an electronic device module extending in a direction along the length of the modular electronic roofing attachment 10, a thickness of the electronic device module extending in a direction along a slot along the length of the modular electronic roofing attachment 10, and a height of the electronic device module extending from a bottom of the modular electronic roofing attachment 10 upwards toward the ridge vent 140 along the depth of the modular electronic roofing attachment 10.

However, other arrangements may be used, such as a horizontal slot arrangement where one or more columns of slots are positioned along the depth of the modular electronic roofing attachment 10 such that a width of an electronic device module extending in a direction along the width of the modular electronic roofing attachment 10, a thickness of the electronic device module extending in a direction along a slot along the depth of the modular electronic roofing attachment 10, and a length of the electronic device module extending in a direction along the length of the modular electronic roofing attachment 10. In other words, the electronic device modules may be slotted in a vertical arrangement in a row along the length of the modular electronic roofing attachment 10 in the vertical slot arrangement and the electronic device modules may be slotted in a horizontal arrangement such as a stack along the depth of the modular electronic roofing attachment 10.

Thus, the modular electronics roofing attachment 100 may have slots may with a size to fit a series of electronic device modules. In some embodiments, the size of the slot may be in a range of, e.g., 1 to 6 inches, or other suitable range. An example size of the slots along the length of the electronics roofing attachment 100 may be, e.g., one rack unit, which is equivalent to approximately 1.25 inches.

Moreover, in some embodiments, the modular electronics roofing attachment 100 may be configured as a drop-in module for the roof deck slot 26 such that a contractor or builder may fit the modular electronics roofing attachment 100 into the roof deck slot 26. Thus, in some embodiments, the roof deck slot 26 may have a predetermined size or may be selected from a set of predetermined sizes that may be standardized for roof deck slots 26. In some embodiments, the roof deck slot 26 may be formed based on the width of the modular electronics roofing attachment 100.

Thus, the modular electronics roofing attachment 100 may have a width that is selected to be compatible with the ridge vent 140 and/or with the common width of the roof deck slot 26. For example, the modular electronics roofing attachment 100 may have a width of, e.g., 6 inches, 7 inches, 8 inches, 9 inches, 10 inches, 11 inches, 12 inches, 13 inches, 14 inches, 15 inches, 16 inches, 17 inches, 18 inches, 19 inches, 20 inches, or any other suitable width within, e.g., the range of 8 inches to 10 inches, in a range of 6 inches to 24 inches, or in any other suitable range of widths.

Similarly, in some embodiments, the roof deck slot 26 may include a predetermined or common depth into the structure 2. For example, the roof deck slot 26 may be an opening into an open space of an attic. Accordingly, the depth of the modular electronics roofing attachment 100 may be configured or selected for the depth of the roof deck slot 26. In some embodiments, because the roof deck slot 26 may open into the attic of the structure, thus providing multiple feet of depth below the ridge 24, the modular electronics roofing attachment 100 may be sized according to the electronic device modules. In some embodiments, the modular electronics roofing attachment 100 may have a depth extending from the ridge 24 into the interior of the structure for a distance of, e.g., 6 inches, 7 inches, 8 inches, 9 inches, 10 inches, 11 inches, 12 inches, 13 inches, 14 inches, 15 inches, 16 inches, 17 inches, 18 inches, 19 inches, 20 inches, 21 inches, 22 inches, 23 inches, 24 inches, 25 inches, 26 inches, 27 inches, 28 inches, 29 inches 30 inches or any other suitable width within, e.g., the range of 10 inches to 24 inches, in a range of 12 inches to 18 inches, or in any other suitable range of depths into the interior of the structure.

In some embodiments, the modular electronics roofing attachment 100 may be inserted into the roof deck slot 26 and covered by the cover 240. The cover 240 may thus provide a water shedding layer to protect the electronic device modules from precipitation and debris. In some embodiments, to preserve the ability to ventilate the interior of the structure via the cover 240, the modular electronics roofing attachment 100 may have a length less than the length of the roof deck slot 26 while the length of the cover 240 may be coextensive with or exceed the length of the roof deck slot 26. Thus, there may be openings in the roof deck slot 26 between one or more edges of the roof deck 220 and one or more sides of the modular electronics roofing attachment 100 where air may ventilate through the cover 240. In some embodiments, the length of the roof deck slot 26 and of the modular electronics roofing attachment 100 may be selected according to a desired number of electronic device modules and a ventilation need.

For example, the length of the modular electronics roofing attachment 100 may be any length in a range from, e.g., 6 inches to 100 feet, 1 feet to 100 feet, 2 feet to 100 feet, 3 feet to 100 feet, 4 feet to 100 feet, 5 feet to 100 feet, 6 feet to 100 feet, 7 feet to 100 feet, 8 feet to 100 feet, 9 feet to 100 feet, 10 feet to 100 feet, 1 foot to 50 feet, 2 feet to 50 feet, 3 feet to 50 feet, 4 feet to 50 feet, 5 feet to 50 feet, 6 feet to 50 feet, 7 feet to 50 feet, 8 feet to 50 feet, 9 feet to 50 feet, 10 feet to 50 feet, 1 feet to 40 feet, 2 feet to 40 feet, 3 feet to 40 feet, 4 feet to 40 feet, 5 feet to 40 feet, 6 feet to 40 feet, 7 feet to 40 feet, 8 feet to 40 feet, 9 feet to 40 feet, 10 feet to 40 feet, 1 feet to 30 feet, 2 feet to 30 feet, 3 feet to 30 feet, 4 feet to 30 feet, 5 feet to 30 feet, 6 feet to 30 feet, 7 feet to 30 feet, 8 feet to 30 feet, 9 feet to 30 feet, 10 feet to 30 feet, 1 feet to 20 feet, 2 feet to 20 feet, 3 feet to 20 feet, 4 feet to 20 feet, 5 feet to 20 feet, 6 feet to 20 feet, 7 feet to 20 feet, 8 feet to 20 feet, 9 feet to 20 feet, 10 feet to 20 feet, or any other suitable length or range of lengths for providing ventilation while housing one or more electronic device modules.

Figure 2B:
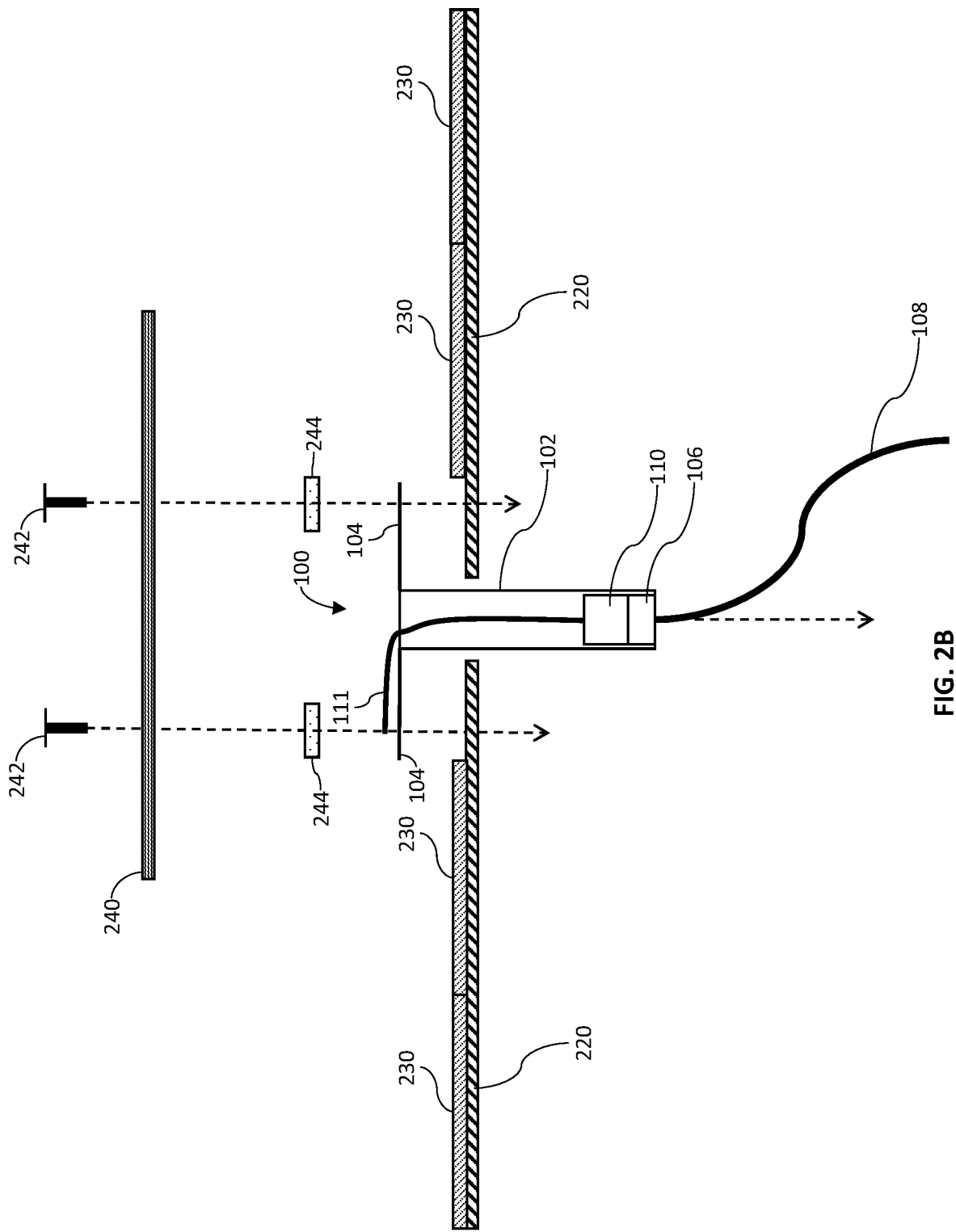
FIG. 2B depicts a cross section illustration of cross section B-B of FIG. 2A, the modular electronics roofing attachment 100 installed in an opening of a face of the roof 20 in accordance with one or more embodiments of the present disclosure.

In some embodiments, the modular electronics roofing attachment 100 may include one or more securing mechanisms 104. In some embodiments, the securing mechanism 104 may be positions towards a top portion of the modular electronics roofing attachment 100 to provide a component that attaches the modular electronics roofing attachment 100 to the roof face(s) 23, the roof deck 220, and/or a waterproofing layer 230, either directly or indirectly. For example, the securing mechanism(s) 104 may include, e.g., one or more extensions as illustrated in FIGS. 2A and 2B that extend as tabs and/or wings from the housing of the modular electronics roofing attachment 100 to overlap with the waterproofing layer 230 and/or roof deck 220 such that the housing of the modular electronics roofing attachment 100 hangs down into the interior of the structure 2 through the roof deck slot 26. In some embodiments, the securing mechanism(s) 104 may include any other suitable component for securing the modular electronics roofing attachment 100 in the roof deck slot 26, or any combination thereof, including but not limited to, e.g., one or more hooks, clamps, tabs, wings, fasteners (e.g., bolt, screw, rivet, pin, etc.), adhesive, snap fitments, latches, or any other suitable securing mechanism or any combination thereof.

In some embodiments, the roof 20 may include one or more wireways 27 that provide an enclosure for wiring, cabling, and other peripherals of the roofing accessories. In some embodiments, the wireway 27 may be over the waterproofing layer 230, directly on roof deck 220 and/or recessed into the roof deck 220. For example, the wireway 27 may formed on or in the roof 20 such that a top surface of the enclosure of the wireway 27 is coplanar with a top surface of the roof deck 220 and/or the waterproofing layer 230. For example, the wireway 27 may be covered by the waterproofing layer 230 and/or by an additional watershedding component.

In some embodiments, enable the wiring, cabling and/or peripherals in the wireway 27 to interface with an electronic device module 110 within the modular electronics roofing attachment 100, the housing of the modular electronics roofing attachment 100 may include an opening 114 configured to mate with the wireway 27 such that wiring and/or cabling of the roofing accessories may enter the modular electronics roofing attachment 100 to interface with the electronic device module. Alternatively, or in addition, wiring and/or cabling of the electronic device module may exit the modular electronics roofing attachment 100 to interface with the wiring, cabling and/or peripherals of the roofing accessories.

In some embodiments, one exemplary orientation of the roof deck slot 26 and wireway 27 is depicted. Other orientations are also contemplated. For example, the roof deck slot 26 may be arranged such that the length of the roof deck slot 26 is perpendicular to a ridge of the roof (e.g., as illustrated in FIG. 2A), parallel to the ridge of the roof or at any other angle. Similarly, the wireway 27 may be arranged such that a length of the wireway 27 is perpendicular to a ridge of the roof, parallel to the ridge of the roof (e.g., as illustrated in FIG. 2A) or at any other angle. In some embodiments, the roof deck slot 26 and the wireway 27 may be perpendicular to each other, parallel to each other, or at any relative angle between the two.

FIG. 2B depicts a cross section illustration of cross section B-B of FIG. 2A, the modular electronics roofing attachment 100 installed in an opening of a face of the roof 20 in accordance with one or more embodiments of the present disclosure.

In some embodiments, an example of the modular electronics roofing attachment 100 adapted for insertion into the roof slot 16 may include securing mechanisms 104 including extensions extending from a top end of the housing 102 of the modular electronics roofing attachment 100. In some embodiments, the extensions extend outwards over the roof 20 such that each extension overlaps with opposing sides of the ridge 24 of the roof 20. Thus, the modular electronics roofing attachment 100 may be inserted into the roof deck slot 26 and prevented by the extensions from falling through the roof deck slot 26.

In some embodiments, to secure the modular electronics roofing attachment 100 within the roof deck slot 26, the cover 240 may cover the modular electronics roofing attachment 100 such that the cover 240 overlaps with the extensions. Fasteners 242 may be used such that each fastener 242 penetrates both the cover 240 and at least one extension of the modular electronics roofing attachment 100 and into the roof deck 220. In some embodiments, the fasteners 242 may also penetrate the waterproofing layer 230. Accordingly, the extensions and the cover 240 may be attached to the roof 20 over the waterproofing layer 230. Alternatively, the extensions may be positioned under the waterproofing layer 230 while the cover 240 is positioned over the waterproofing layer 230. In some embodiments, the waterproofing layer 230 may be over both the ridge vent 240 and the extensions, or may not overlap with one or both of the cover 240 and/or the extensions. Any configuration of the waterproofing layer 230, the extensions and the cover 240 may be employed.

In some embodiments, the cover 240 may be used with an air-permeable mat 244 of fibrous material that can be of randomly oriented synthetic, air-permeable fibers with varying mesh sizes. In some embodiments, the air-permeable mat 244 may be provided on one or more sides of the cover 240. In some embodiments, to prevent intrusion of water, the air-permeable mat 244 may be omitted from an edge of the cover 240 that is facing higher portion of the roof 20 based on the pitch of the roof 20. The synthetic fibers, such as made by nylon and polyester are randomly aligned into a web. The thickness of the mat may be from about 0.5 to 3 inches. The air-permeable mat 244 can be cut into strips the length and width of which is determined by the length and width of the cover 240 for which the strip is used. The air-permeable mat 244 can be placed on the waterproofing layer 230. Alternatively, the air-permeable mat 244 may be integrated to the cover 240 during manufacture or post-manufacture by any known method including, but not limited to, adhesively fixing, using burrs or by hooking the mat with hooks integral with the cover 240.

In some embodiments, the process of installing the cover 240 may include the steps of placing cover 240 over the modular electronics roofing attachment 100 and the roof deck slot 26 of the roof ridge 24, flexing the cover 240 at a center hinge to conform to the roof, and/or fixing the cover 240 to the roof 20 with the fasteners 242. In some embodiments, the fasteners 242 may include, e.g., nails, screws, hooks, rivets or adhesives or any other known method can fix the cover 240 to the roof. Further, the air-permeable mat 244 can be placed along the roof ridge 24 adjacent to the roof deck slot 26 prior to placing the cover 240 over the roof deck slot 26.

In some embodiments, the air-permeable mat 244 may be positioned between the cover 240 and the securing mechanism(s) 104 of the modular electronics roofing attachment 100, between the modular electronics roofing attachment 100 and the waterproofing layer 230, or both. In some embodiments, the air-permeable mat 244 may be configured to allow electronic device module wiring 111 to traverse the air-permeable mat 244 such that the electronic device module wiring 111 may extend between the exterior of the modular electronics roofing attachment 100 and the interior of the modular electronics roofing attachment 100 in order to interface with the roofing accessories and/or with wiring/cabling/peripherals thereof. In some embodiments, to enable the electronic device module wiring 111 to extend through the air-permeable mat 244, the air-permeable mat 244 may include, e.g., a gap sized to fit the electronic device module wiring 111. Alternatively, or in addition, the air-permeable mat 244 may be compressible such that the electronic device module wiring 111 may be pressed between the air-permeable mat 244 and the cover 240 or securing mechanism(s) 104. In some embodiments, the electronic device module wiring 111 may extend between the cover 240 and the securing mechanism 104 without the air-permeable mat 244, and/or may extend through the opening 114 as described above.

In some embodiments, the electronic device module wiring 111 may be connected to an electronic device module 110 within the housing 102 of the modular electronics roofing attachment 100. In some embodiments, the electronic device module 110 may include any suitable electronic device for providing data communication, processing components, memory components, and/or electrical components to one or more roofing accessories positioned on or near the roof 20. For example, the electronic device module 110 may include a power inverter for exchanging power between interior power sources and/or power draws and the one or more roofing accessories. As another example, the electronic device module 110 may include a compute module for providing network attached memory, storage and/or processing resources connected to a network via a roof mounted antenna.

In some embodiments, the electronic device module 110 may be connected to other electronic device modules 110 within the modular electronics roofing attachment 100 and/or with power and/or computational resources in the interior of the structure 2. In some embodiments, an electronics bus 106 may be positioned with the module electronics roofing attachment 100 to interface with the electronic device modules 110 to provide power and/or data connections with the other electronic device modules 110 within the modular electronics roofing attachment 100 and/or with power and/or computational resources in the interior of the structure 2. For example, the electronics bus 106 may include a power bus, a power cable, a data bus, a control bus, an address bus, among other busses and/or connections or any combination thereof.

In some embodiments, a cable 108 may extend out of the housing 102 of the modular electronics roofing attachment 100. In some embodiments, the cable 108 may connect the electronics bus 106 to power and/or computational components within the interior of the structure. In some embodiments, the cable 108 may pass electrical power between power storage (e.g., a battery, generator or other power storage or any combination thereof) and the electronic device module 110. In some embodiments, the cable 108 may pass data between the electronic device module 110 and one or more computing devices, WiFi routers, or other computational components within the structure 2. Thus, the modular electronics roofing attachment 100 leverages the roof deck slot 26 to enable the electronics bus 106 to provide an interface in the modular electronics roofing attachment 100 to enable electronic device modules 110 to communicate with, exchange electrical power and/or control one or more roofing accessories and components in the structure 2.

Figure 3:
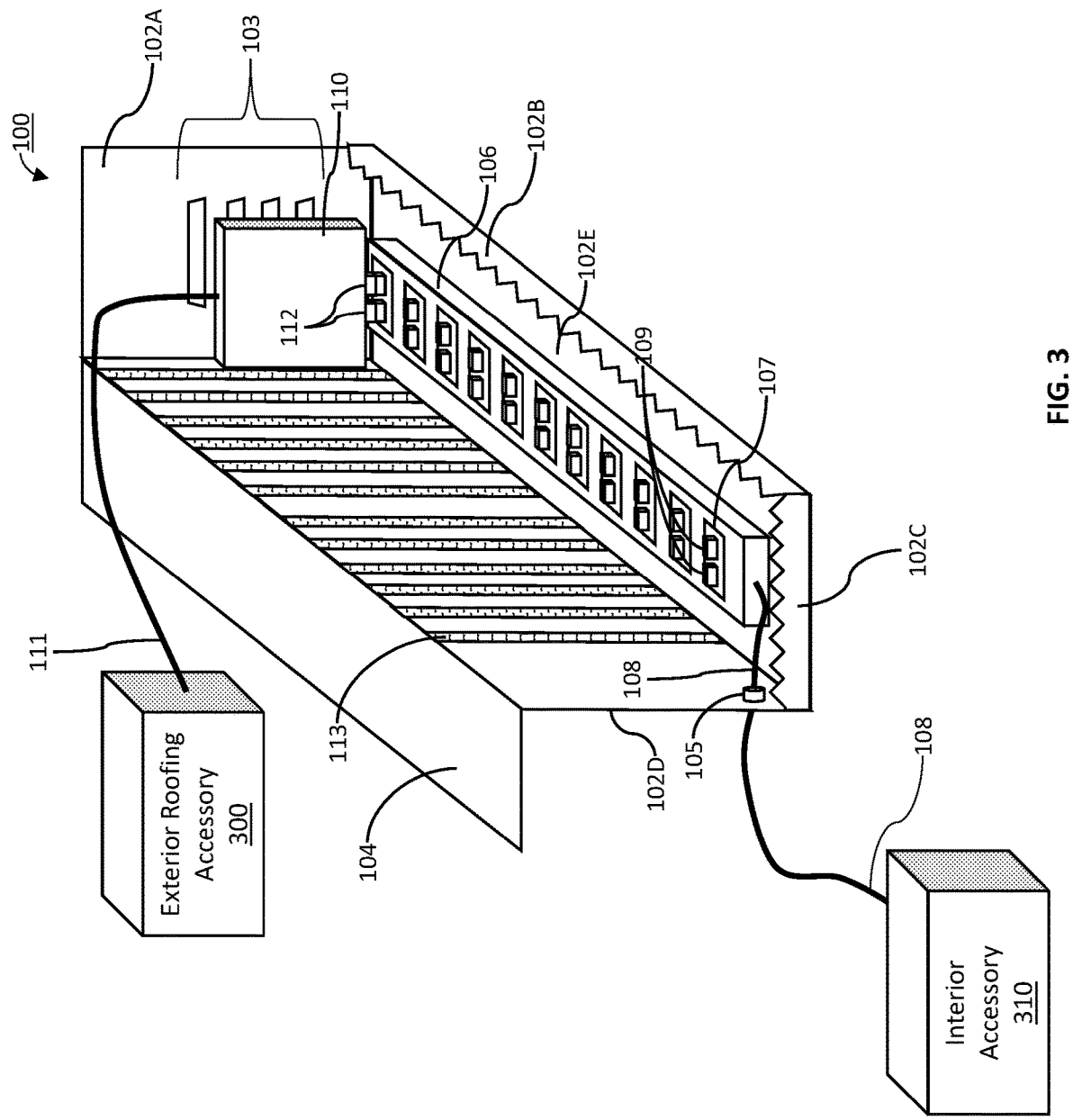
FIG. 3 illustrates the modular electronics roofing attachment 100 in accordance with one or more embodiments of the present disclosure.

FIG. 3 illustrates the modular electronics roofing attachment 100 in accordance with one or more embodiments of the present disclosure.

In some embodiments, the housing 102 of the module electronics roofing attachment 100 may be in a form of frame that may include one or more sidewalls. In some embodiments, the sidewalls may also include a first wall 102A, a second wall 102B, a third wall 102C and a fourth wall 102D. While the housing is illustrated in FIG. 3 as having four walls in a rectangular arrangement, other arrangements are possible, such as, e.g., 3 or more sidewalls with equiangular arrangements or non-equiangular arrangements. In some embodiments, the housing 102 may also include a bottom wall or floor 102E. Together, the sidewalls may form a frame to carry and/or enclose the electronic device modules 110.

In some embodiments, each sidewall of the housing 102 may include solid piece of material, a porous piece of material, a mesh, a grate, a cage, or other suitable permeable or impermeable barrier. For example, in some embodiments, one or more sidewalls, such as the first wall 102A may include vents 103 to enable airflow to enter and exit the housing 102. The vents 103 may facilitate cooling and/or heating of the electronic device modules 110 using active or passive means for forming airflow (e.g., using a fan or pump). In some embodiments, one or more of the sidewalls may be absent or otherwise present an opening into the housing 102.

In some embodiments, the sidewalls, including the first wall 102A, the second wall 102B, the third wall 102C, the fourth wall 102D and the bottom wall 102E, may be separately formed and attachable to each other. However, in some embodiments, two or more the sidewalls, including the first wall 102A, the second wall 102B, the third wall 102C, the fourth wall 102D and the bottom wall 102E, may be fixed to each other, such as by being integrally formed together, fastened together with a suitable fastener (e.g., bolt, screw, rivet, pin, etc.), connected via an adhesive, or by some other method. In some embodiments, the sidewalls 102A-102E may include at least one of molded or extruded plastic, aluminum, steel, a polymer composite material, or any other polymer, metal, composite, glass ceramic, etc., or any combination thereof.

In some embodiments, the modular electronics roofing attachment 100 may include at least one securing mechanism 104. In some embodiments, the securing mechanism 104 may be positions towards a top portion of the modular electronics roofing attachment 100 to provide a component that attaches the modular electronics roofing attachment 100 to the ridge 14, the ridge vent 140, the roof face(s) 13, the roof deck 120, and/or a waterproofing layer 130, either directly or indirectly. For example, the securing mechanism(s) 104 may include, e.g., one or more extensions as illustrated in FIGS. 1A and 1B and FIGS. 2A and 2B, that extend as tabs and/or wings from the housing of the modular electronics roofing attachment 100 to overlap with the waterproofing layer and/or roof deck such that the housing of the modular electronics roofing attachment 100 hangs down into the interior of the structure. In some embodiments, the securing mechanism(s) 104 may include any other suitable component for securing the modular electronics roofing attachment 100 in the ridge slot 16, or any combination thereof, including but not limited to, e.g., one or more hooks, clamps, tabs, wings, fasteners (e.g., bolt, screw, rivet, pin, etc.), adhesive, snap fitments, latches, or any other suitable securing mechanism or any combination thereof.

In some embodiments, the securing mechanism 104 may be attached to the housing 102 of the modular electronics roofing attachment 100, either directly or indirectly. For example, the securing mechanism 104 and the housing 102 may be, e.g., integrally formed together, fastened together with a suitable fastener (e.g., bolt, screw, rivet, pin, etc.), connected via an adhesive, or by some other method. In some embodiments, the securing mechanism 104 may include at least one of molded or extruded plastic, aluminum, steel, a polymer composite material, or any other polymer, metal, composite, glass ceramic, etc., or any combination thereof.

In some embodiments, at least one electronics bus 106 may be positioned in the housing 102, such as, e.g., via attachment to one or more sidewalls. For example, the electronics bus 106 may be positioned on, attached to, or integral with, e.g., the bottom wall 102E. While only one electronics bus 106 is shown in FIG. 3, multiple electronics busses 106 may be positioned in the housing 102, e.g., in an end-to-end relationship along the length of the modular electronics roofing attachment 100, side-by-side across the width of the modular electronics roofing attachment 100, side-by-side across the length of the modular electronics roofing attachment 100, or a combination thereof depending on the orientation of each electronics bus 106 in the housing 102 and/or the length and width of each of the electronics bus 106 and the housing 102.

In some embodiments, the electronics bus 106 may include one or more system busses for enabling the communication of electricity and/or data across the electronic device modules 110 and/or with one or more exterior roofing accessories 300 and/or one or more interior accessories 310. In some embodiments, the electronics bus 106 may include any suitable hardware and/or software protocol for enabling the interconnect of various electronics components. In some embodiments, the electronics bus 106 may include any suitable communication system that transfers data between components inside the computer system, include an internal data bus, memory bus, system bus, address bus, front-side bus, or other internal bus or any combination thereof. In some embodiments, examples of the bus may include, e.g., universal serial bus (USB), PCI express, small computer system interface (SCSI), parallel AT attachment (PATA), serial AT attachment (SATA), HyperTransport™, Infini- Band™, Wishbone, Compute Express Link (CXL), among others or any combination thereof.

In some embodiments, the electronics bus 106 may be configured for the insertion and/or removal of modular components, including the electronic device modules 110. Accordingly, in some embodiments, the electronics bus 106 may include one or more interfaces 107 for removably connecting the electronic device modules 110 to the electronics bus 106.

Accordingly, in some embodiments, each bus interface 107 of the electronics bus 106 may include one or more standardized connectors 109 that are configured for removable attachment of electronics. In some embodiments, the standardized connector(s) 109 may include one or more connectors for transferring electrical power, exchanging data, communicating control signals, among other tasks and commands. For example, there may be a standardized connector 109 for data, a standardized connector 109 for electrical power, a standardized connector for audio signals, video signals, analog signals, address signals, among other signals or any combination thereof. Each standardized connector 109 may be a separate connectors, or may be integrated into one or more combined standardized connectors 109. In some embodiments, examples of standardized connectors 109 may include a, e.g., PCIe interface, USB interface, SATA interface, or any other suitable interface for transferring data and/or power and/or commands and/or signals according to a suitable interface technology.

In some embodiments, the electronic device module 110 may include one or more standardized connectors 112 that mate to the standardized connectors 109 of the electronics bus 106. For example, the standardized connectors 112 may include the same interface technology and/or the same physical/positional arrangement such that the electronic device module 110 may be inserted into the interface 109 to engage the standardized connectors 112 with the standardized connectors 109 and enable cooperation with the electronics bus 106.

In some embodiments, the electronic device module 110 may be inserted into the housing 102 in a slotted arrangement, where each bus interface 107 is associated with a particular slot. In some embodiments, to reinforce the stability of the electronic device module 110 upon insertion, the housing 102 may include a slot mount 113 for each bus interface 107. In some embodiments, the slot mount 113 of each bus interface 107 may be configured to engage with the electronic device module 110 to guide the electronic device module 110 towards the standardized connector(s) 109 of the bus interface 107, and to hold the electronic device module 110 securely in place. In some embodiments, the slot mounts 113 may include any suitable guiding mounts, such as, e.g., a rack mount, a physical slot, guide pins, hangers, or other suitable structures or any combination thereof.

In some embodiments, the slot mount 113 of each bus interface 107 may be attached to the housing 102 of the modular electronics roofing attachment 100, either directly or indirectly. For example, the slot mount 113 and the housing 102 may be, e.g., integrally formed together, fastened together with a suitable fastener (e.g., bolt, screw, rivet, pin, etc.), connected via an adhesive, or by some other method. In some embodiments, the slot mount 113 may include at least one of molded or extruded plastic, aluminum, steel, a polymer composite material, or any other polymer, metal, composite, glass ceramic, etc., or any combination thereof. In some embodiments, the slot mount 113 may be sized and oriented in the housing based on the size and slot arrangement of the electronic device module 110.

In some embodiments, the electronic device module 110 may be mounted within the modular electronic roofing attachment 100, e.g., in a vertical slot arrangement, where one or more rows of slots are positioned along the length of the modular electronic roofing attachment 10 with a width of an electronic device module extending in a direction along the width of the modular electronic roofing attachment 10, a thickness of the electronic device module extending in a direction along a slot along the length of the modular electronic roofing attachment 10, and a height of the electronic device module extending from a bottom of the modular electronic roofing attachment 10 upwards toward the ridge vent 140 along the depth of the modular electronic roofing attachment 10. In some embodiments, the vertical slot arrangement may orient the rows along the width of the modular electronic roofing attachment 100 such that one or more rows of slots are positioned along the width of the modular electronic roofing attachment 10 with a width of an electronic device module extending in a direction along the length of the modular electronic roofing attachment 10, a thickness of the electronic device module extending in a direction along a slot along the length of the modular electronic roofing attachment 10, and a height of the electronic device module extending from a bottom of the modular electronic roofing attachment 10 upwards toward the ridge vent 140 along the depth of the modular electronic roofing attachment 10.

However, other arrangements may be used, such as a horizontal slot arrangement where one or more columns of slots are positioned along the depth of the modular electronic roofing attachment 10 such that a width of an electronic device module extending in a direction along the width of the modular electronic roofing attachment 10, a thickness of the electronic device module extending in a direction along a slot along the depth of the modular electronic roofing attachment 10, and a length of the electronic device module extending in a direction along the length of the modular electronic roofing attachment 10. In other words, the electronic device module 110 may be slotted in a vertical arrangement in a row along the length of the modular electronic roofing attachment 10 in the vertical slot arrangement and the electronic device module 110 may be slotted in a horizontal arrangement such as a stack along the depth of the modular electronic roofing attachment 10.

In some embodiments, the electronic device module 110 may include or otherwise be connected to the electronic device module wiring 111. In some embodiments, the electronic device module wiring 111 extends out of the housing 102 through a top of the housing 102 and out to an exterior of the housing 102 and the structure, e.g., between the securing mechanism and a ridge vent or cover as described above with respect to FIGS. 1A-1B and 2A-2B. In some embodiments, the electronic device module wiring 111 may be in communication with one or more exterior roofing accessories 300, such as, e.g., a solar panel, a solar module, a radio, an antenna, an imaging device, a display device, or any other suitable electronic device positioned on or near the roof of the structure.

For example, in some embodiments, the exterior roofing accessory 300 may include one or more antennas and/or radios. The exterior roofing accessory 300 may be networked with multiple roofing accessories including antennas and/or radios networked together, e.g., using cellular (e.g., 4G, 5G, etc.) signals to create a large-scale software defined network. Such a network may be leveraged to implement a distributed datacenter across the roofing accessories on the network. Accordingly, the electronic device modules 110 may be configured to share storage and compute resources for distributed processing and storage of user data via the external roofing accessory 300. In some embodiments, the electronic device module 110 or another electronic device module 110 may control the exterior roofing accessory 300, e.g., using one or more hardware defined and/or software defined radios and/or control devices, to communicate on the network to participate in the distributed datacenter. Such a distributed datacenter may be employed for, e.g., cloud storage, media and data streaming, content distribution (e.g., as a content distribution network (CDN)), among other distributed applications.

Similarly, in some embodiments, the electronics bus 106 may include the cable 108, which may extend out of the housing 102 via a suitable wire passthrough 105. Thus, the cable 108 may pass through one or more sidewalls 102A-102E of the housing 102 and into an interior of the structure. Accordingly, the electronics bus 106 may connect to an interior accessory 310 within the structure via the cable 108. The interior accessory 310 may include a suitable computing device, WiFi router, power module, battery or other power storage, data storage device, or other suitable electronic device or component or any combination thereof. As a result, the electronic device module 110 may communicate with the interior accessory 310 via the electronics bus 106.

In some embodiments, the term "computing device" may include at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Figure 4:
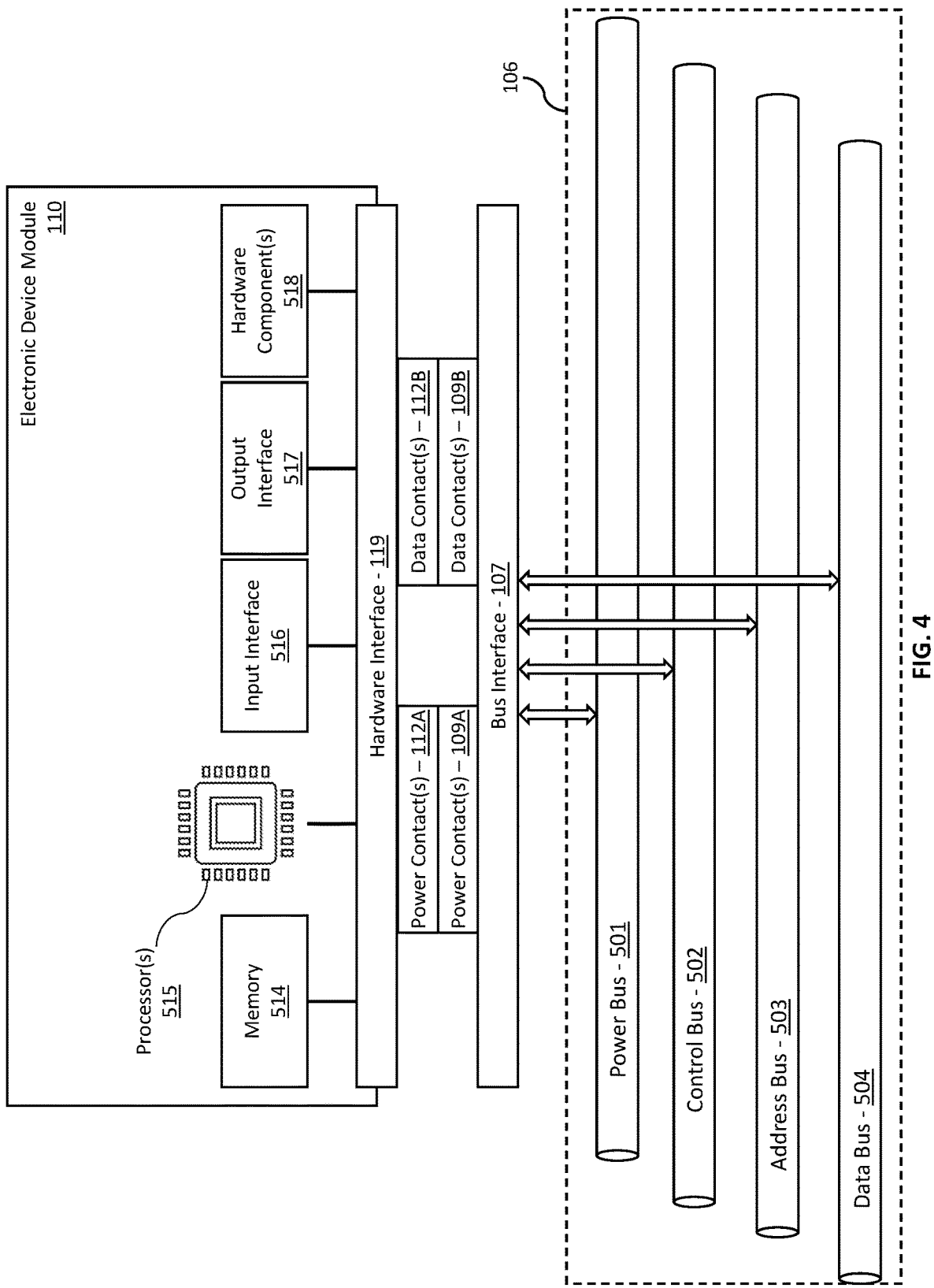
FIG. 4 illustrates the system bus of the modular electronics roofing attachment 100 in communication with the electronic device module 110 in accordance with one or more embodiments of the present disclosure.

FIG. 4 illustrates the system bus of the modular electronics roofing attachment 100 in communication with the electronic device module 110 in accordance with one or more embodiments of the present disclosure.

In some embodiments, the electronic device module 110 may include computer hardware and software components. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

In some embodiments, the electronic device module 110 may include at least one memory 514. The memory 514 may include, e.g., a suitable memory or storage solutions for maintaining electronic data. For example, the memory 514 may include database technology such as, e.g., a centralized or distributed database, cloud storage platform, decentralized system, server or server system, among other storage systems. In some embodiments, the memory 514 may, additionally or alternatively, include one or more data storage devices such as, e.g., a hard drive, solid-state drive, flash drive, or other suitable storage device. In some embodiments, the memory 514 may, additionally or alternatively, include one or more temporary storage devices such as, e.g., a random-access memory, cache, buffer, or other suitable memory device, or any other data storage solution and combinations thereof.

In some embodiments, the electronic device module 110 may include at least one processor 515. In some embodiments, the processor(s) 515 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processing device may include data-processing capacity provided by the microprocessor. In some embodiments, the microprocessor may include memory, processing, interface resources, controllers, and counters. In some embodiments, the microprocessor may also include one or more programs stored in memory.

In some embodiments, the electronic device module 110 may include an input interface 516 and an output interface 516 (hereinafter collectively "I/O 516/517") for receiving and sending data and instructions. In some embodiments, the I/O 516/517 implement one or more interfacing, communication and/or networking protocols to enable the exchange of data using the electronics bus 106. For example, the I/O 516/517 may implement logic for using the electronics bus 106, such as, e.g., handshaking, data format conversion, serial to parallel and/or parallel to serial data conversion, generating interrupts, memory-mapping, transput, among other functions to enable communication and interfacing with the electronics bus 106.

In some embodiments, the electronic device module 110 may include additional hardware component(s) 518. The additional hardware component(s) 518 may include, e.g., one or more sensors, imaging devices, storage drives, radios (e.g., Bluetooth, WiFi, cellular, NFC, RFID, Z-Wave, ZigBee, Matter, etc.), or other hardware components or any combination thereof.

In some embodiments, each component of the electronic device module 110 may be connected to the electronics bus 106 using the standardized connector(s) 112. For example, the standardized connector(s) 112 may include a power contact 112A and a data contact 112B that, respectively, interface with a mating power contact 109A and data contact 109B of the standardized connector(s) 109.

In some embodiments, the components of the electronic device module 110 may be connected to the power contact 112A and the data contact 112B using a hardware interface 119. In some embodiments, the hardware interface 119 may include one or more module-specific interfaces and/or busses to provide interconnect between each component and the power contact 112A and data contact 112B.

Accordingly, in some embodiments, the hardware interface 119, the power contact 112A and data contact 112B, the power contact 109A and data contact 109B, and the bus interface 107 may enable the components of the electronic device module 110 to interface with the electronics bus 106, which in turn enables the electronic device module 110 to interface with the interior accessory 310 described above, among other devices, peripherals and accessories.

In some embodiments, the electronics bus 106 may include one or more component busses. In some embodiments, the component busses may include, e.g., a power bus 501, a control bus 502, an address bus 503 and a data bus 504, among others or any combination thereof.

In some embodiments, the power bus 501 may transport electricity to and from the electronic device module 110 and/or components thereof. In some embodiments, the control bus 502 may carry signals from the processor(s) 515 and convert the signals into various parts of the computer including the I/O 516/517 and/or the hardware component(s) 518 (e.g., keyboard, mouse, disk drive, printer, radio, sensor, imaging device, codec, etc.). The control bus carries the control, timing and coordination signals to manage the various functions across the system. In some embodiments, the address bus 503 may determine the correct location of memory 514 and the data is received or received from it. The address bus 503 is used to specify memory locations for the data being transferred. In some embodiments, the data bus 504 may send computer information or instructions to an output device, such as the interior accessory 310 connected to the electronics bus 106 via the cable 108. The data bus, which may be a bidirectional path, may carry the actual data between the processor 515, the memory 514, the I/O 516/517 and/or the hardware component(s) 518.

In some embodiments, the design of the electronics bus 106 may vary from system to system and can be specific to a particular computer design or may be based on an industry standard. In some embodiments, the electronics bus 106 is configured for modular attachment of electronic device modules 110, and thus may be based on an industry standard or other published standard to enable third-parties to produce compatible electronic device modules 110.

In some embodiments, system bus characteristics may be dependent on the needs of the processor 515, the speed, and the word length of the data and instructions. The size of the electronics bus 106, also known as its width, determines how much data can be transferred at a time and indicates the number of available wires. A 32-bit bus, for example, refers to 32 parallel wires or connectors that can simultaneously transmit 32 bits. In some embodiments, the electronics bus 106 may include, e.g., a 16 bit bus, a 32 bit bus, a 64 bit bus, a 128 bit bus, a 256 bit bus, a 512 bit bus, a 1024 bit bus, or other suitable width or any combination thereof.

In some embodiments, the electronics bus 106 and/or the electronic device module 110 may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

In some embodiments, the electronics bus 106 and/or the electronic device module 110 may be configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some embodiments, the electronic device module 110 may be used as a server for data storage and data/software service to remote devices. In some embodiments, the term "server" may refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, the electronics bus 106 and/or the electronic device module 110 may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

In some embodiments, the electronics bus 106 and/or the electronic device module 110 may be configured to handle numerous concurrent devices and/or users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

At least some aspects of the present disclosure will now be described with reference to the following numbered clauses.

1. A system comprising:
    a ridge vent configured to cover a ridge slot in a roof of a structure to provide ventilation to an interior of the structure;
    a housing having a length, a width and a height that are sized to fit through a ridge slot of a roof of a structure into an interior of the structure;
        wherein the housing comprises:
            a top portion proximal to the ridge vent,
            a bottom portion proximal to the interior of the structure and opposite to the top portion, and
            at least one wall extending between the top portion and the bottom portion;
    at least one securing mechanism connected to the top portion of the housing;
        wherein the at least one securing mechanism is configured to secure the housing within the ridge slot;
    at least one electronics bus positioned on the at least one wall within the housing;
        wherein the at least one electronics bus comprises at least one interface that is configured to be utilized to operate a plurality of modular electronic devices that are removably positioned within the housing.

2. A method comprising:
    providing at least one modular electronics roofing attachment comprising:
        a housing having a length, a width and a height that are sized to fit through a ridge slot of a roof of a structure into an interior of the structure;
            wherein the housing comprises:
                a top portion,
                a bottom portion and opposite to the top portion, and
                at least one wall extending between the top portion and the bottom portion;
        at least one securing mechanism connected to the top portion of the housing;
            wherein the at least one securing mechanism is configured to secure the housing within the ridge slot;
        at least one electronics bus positioned on the at least one wall within the housing;
            wherein the at least one electronics bus comprises at least one interface that is configured to be utilized to operate a plurality of modular electronic devices that are removably positioned within the housing.
    inserting the housing into the ridge slot such that the bottom portion extends into the interior of the structure;
    securing the housing within the ridge slot by the at least one securing mechanism; and
        wherein a ridge vent is configured to cover the ridge slot in the roof to provide ventilation to an interior of the structure.

3. The system and/or method any of clauses 1 and/or 2, wherein the length is configured to have a length difference between the length and a ridge vent length of the ridge vent to enable the ventilation around the housing.

4. The system and/or method any of clauses 1 and/or 2, wherein the at least one securing mechanism comprises a plurality of roofing nails; and
    wherein each roofing nail of the plurality of roofing nails extends through the ridge vent into a face of the roof to secure both the ridge vent and the at least one housing to the roof.

5. The system and/or method any of clauses 1 and/or 2, wherein the at least one securing mechanism comprises at least one adhesive that adheres the at least one securing mechanism to the ridge vent.

6. The system and/or method of clause 4, wherein the at least one securing mechanism comprises at least one additional fastening mechanism that secures the ridge vent to the roof.

7. The system and/or method any of clauses 1 and/or 2, further comprising a plurality of slots arranged in a row along the at least one electronics bus; and
    wherein each slot of the plurality of slots comprises the at least one interface and at least one standardized connector.

8. The system and/or method of clause 6, wherein the at least one standardized connector is two standardized connector, the two standardized connector comprising:
    a first standardized connector configured for data communication between the at least one electronics bus and the at least one modular electronics device, and
    a second standardized connector configured to provide electrical power from the at least one electronics bus to the at least one modular electronic device.

9. The system and/or method of clause 6, wherein the at least one standardized connector is one standardized connector configured to provide data communication and power between the at least one electronics bus to the at least one modular electronic device.

10. The system and/or method of clause 6, wherein the at least one electronics bus extends in a direction along the length of the housing; and
    wherein each slot of the plurality of slots comprises a distance along the at least one electronics bus equivalent to one rack unit.

11. The system and/or method any of clauses 1 and/or 2, wherein the housing comprises at least one opening proximal to the top portion; and
    wherein the at least one opening is configured to mate with an end of a wireway position along a face of the roof.

12. The system any of clauses 1 and/or 2, wherein the plurality of modular electronic devices comprise at least two different modular electronic devices.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A system comprising:
    a ridge vent configured to cover a ridge slot in a roof of a structure to provide ventilation to an interior of the structure;
    a housing having a length, a width and a height that are sized to fit through the ridge slot into the interior of the structure;
        wherein the housing comprises:
            a top portion proximal to the ridge vent,
            a bottom portion proximal to the interior of the structure and opposite to the top portion, and
            at least one wall extending between the top portion and the bottom portion;
    at least one securing mechanism connected to the top portion of the housing;
        wherein the at least one securing mechanism is configured to secure the housing within the ridge slot;
    at least one electronics bus positioned on the at least one wall within the housing;
        wherein the at least one electronics bus comprises at least one interface that is configured to be utilized to operate a plurality of modular electronic devices that are removably positioned within the housing.

2. The system of claim 1, wherein the length of the housing is configured to have a length difference between the length and a ridge vent length of the ridge vent to enable the ventilation around the housing.

3. The system of claim 1, wherein the at least one securing mechanism comprises a plurality of roofing nails; and
    wherein each roofing nail of the plurality of roofing nails extends through the ridge vent into a face of the roof to secure both the ridge vent and the housing to the roof.

4. The system of claim 1, wherein the at least one securing mechanism comprises at least one adhesive that adheres the at least one securing mechanism to the ridge vent.

5. The system of claim 4, wherein the at least one securing mechanism comprises at least one additional fastening mechanism that secures the ridge vent to the roof.

6. The system of claim 1, further comprising a plurality of slots arranged in a row along the at least one electronics bus; and
    wherein each slot of the plurality of slots comprises the at least one interface and at least one standardized connector.

7. The system of claim 6, wherein the at least one standardized connector is two standardized connector, the two standardized connector comprising:
    a first standardized connector configured for data communication between the at least one electronics bus and at least one modular electronics device of the plurality of module electronics devices, and
    a second standardized connector configured to provide electrical power from the at least one electronics bus to the at least one modular electronics device of the plurality of module electronics devices.

8. The system of claim 6, wherein the at least one standardized connector is one standardized connector configured to provide data communication and power between the at least one electronics bus to the at least one modular electronics device of the plurality of module electronics devices.

9. The system of claim 6, wherein the at least one electronics bus extends in a direction along the length of the housing; and
    wherein said each slot of the plurality of slots comprises a distance along the at least one electronics bus equivalent to one rack unit.

10. The system of claim 1, wherein the housing comprises at least one opening proximal to the top portion; and
    wherein the at least one opening is configured to mate with an end of a wireway position along a face of the roof.

11. The system of claim 1, wherein the plurality of modular electronic devices comprise at least two different modular electronic devices.

12. A method comprising:
    providing at least one modular electronics roofing attachment comprising:
        a housing having a length, a width and a height that are sized to fit through a ridge slot of a roof of a structure into an interior of the structure;
            wherein the housing comprises:
                a top portion,
                a bottom portion and opposite to the top portion, and
                at least one wall extending between the top portion and the bottom portion;
        at least one securing mechanism connected to the top portion of the housing;
            wherein the at least one securing mechanism is configured to secure the housing within the ridge slot;
        at least one electronics bus positioned on the at least one wall within the housing;
            wherein the at least one electronics bus comprises at least one interface that is configured to be utilized to operate a plurality of modular electronic devices that are removably positioned within the housing;
    inserting the housing into the ridge slot such that the bottom portion extends into the interior of the structure;
    securing the housing within the ridge slot by the at least one securing mechanism; and
        wherein a ridge vent is configured to cover the ridge slot in the roof to provide ventilation to an interior of the structure.

13. The method of claim 12, wherein the length of the housing is configured to have a length difference between the length and a ridge vent length of the ridge vent to enable the ventilation around the housing.

14. The method of claim 12, wherein the at least one securing mechanism comprises a plurality of roofing nails; and
    wherein each roofing nail of the plurality of roofing nails extends through the ridge vent into a face of the roof to secure both the ridge vent and the housing to the roof.

15. The method of claim 12, wherein the at least one securing mechanism comprises at least one adhesive that adheres the at least one securing mechanism to the ridge vent.

16. The method of claim 15, wherein the at least one securing mechanism comprises at least one additional fastening mechanism that secures the ridge vent to the roof.

17. The method of claim 12, wherein the at least one modular electronic roofing attachment further comprises a plurality of slots arranged in a row along the at least one electronics bus; and
wherein each slot of the plurality of slots comprises the at least one interface and at least one standardized connector.

18. The method of claim 17, wherein the at least one standardized connector is two standardized connector, the two standardized connector comprising:
a first standardized connector configured for data communication between the at least one electronics bus and at least one modular electronics device of the plurality of module electronics devices, and
a second standardized connector configured to provide electrical power from the at least one electronics bus to the at least one modular electronics device of the plurality of module electronics devices.

19. The method of claim 17, wherein the at least one standardized connector is one standardized connector configured to provide data communication and power between the at least one electronics bus to the at least one modular electronics device of the plurality of module electronics devices.

20. The method of claim 17, wherein the at least one electronics bus extends in a direction along the length of the housing; and
wherein said each slot of the plurality of slots comprises a distance along the at least one electronics bus equivalent to one rack unit.

21. The method of claim 12, wherein the housing comprises at least one opening proximal to the top portion; and
wherein the at least one opening is configured to mate with an end of a wireway position along a face of the roof.

22. The method of claim 12, wherein the plurality of modular electronic devices comprise at least two different modular electronic devices.

* * * * *